United States Patent
Kim et al.

(10) Patent No.: US 10,798,776 B2
(45) Date of Patent: Oct. 6, 2020

(54) V2V COMMUNICATION METHOD AND APPARATUS USING THE SAME

(71) Applicants: Hyundai Motor Company, Seoul (KR); Kia Motors Corporation, Seoul (KR); KOREA POLYTECHNIC UNIVERSITY Industry Academic Cooperation Foundation, Siheung-si (KR)

(72) Inventors: Seung Su Kim, Seoul (KR); Pil Yong Park, Seoul (KR); Jeong Hwan Kim, Seoul (KR); Jin Hyuk Jung, Seoul (KR); Suk Hyun Seo, Suwon-si (KR); Sang Hyun Han, Cheonan-si (KR)

(73) Assignees: Hyundai Motor Company, Seoul (KR); Kia Motors Corporation, Seoul (KR); KOREA POLYTECHNIC UNIVERSITY Industry Academic Cooperation Foundation, Siheung-si (KR)

( * ) Notice: Subject to any disclaimer, the term of this patent is extended or adjusted under 35 U.S.C. 154(b) by 0 days.

(21) Appl. No.: 16/213,353

(22) Filed: Dec. 7, 2018

(65) Prior Publication Data

US 2020/0084826 A1 Mar. 12, 2020

(30) Foreign Application Priority Data

Sep. 10, 2018 (KR) .......... 10-2018-0107712

(51) Int. Cl.
*H04W 76/40* (2018.01)
*G08G 1/09* (2006.01)
(Continued)

(52) U.S. Cl.
CPC ............ *H04W 76/40* (2018.02); *G08G 1/091* (2013.01); *H04W 4/08* (2013.01); *H04W 4/46* (2018.02)

(58) Field of Classification Search
CPC ......... H04W 76/40; H04W 4/46; H04W 4/08; H04W 4/06; G08G 1/091; G08G 1/096791; H04L 12/18
See application file for complete search history.

(56) References Cited

U.S. PATENT DOCUMENTS

| 2002/0057663 A1* | 5/2002 | Lim ...................... H04W 76/40 370/338 |
| 2010/0159976 A1* | 6/2010 | Marocchi ................ H04W 4/08 455/519 |

(Continued)

FOREIGN PATENT DOCUMENTS

| KR | 10-1540878 B1 | 7/2015 |
| KR | 10-1601773 B1 | 3/2016 |

(Continued)

*Primary Examiner* — Chi H Pham
*Assistant Examiner* — Ji-Hae Yea
(74) *Attorney, Agent, or Firm* — Morgan, Lewis & Bockius LLP

(57) ABSTRACT

A vehicle to vehicle (V2V) communication method and an apparatus using the same, for changing a communication method with a surrounding vehicle in consideration of an event type, may include: when an event occurs, determining whether the event is an important event, when the event is the important event, broadcasting data of the event, when the event is not the important event, determining a transmission method depending a communication situation with a surrounding vehicle, and multicasting or broadcasting the data of the event depending on the determined transmission method.

19 Claims, 6 Drawing Sheets

(51) Int. Cl.
*H04W 4/08* (2009.01)
*H04W 4/46* (2018.01)

(56) References Cited

U.S. PATENT DOCUMENTS

2013/0250844 A1* 9/2013 Lee .................... H04L 12/1863
370/312
2016/0042644 A1* 2/2016 Velusamy ............... H04W 4/70
340/435
2017/0243485 A1* 8/2017 Rubin .................... G08G 1/052

FOREIGN PATENT DOCUMENTS

KR    10-2016-0070564 A    6/2016
KR        10-1742778 B1    6/2017

* cited by examiner

FIG. 5

| ID | GROUP | DISTANCE | LANE | COMMUNICATION POSSIBLE | MANUFACTURING COMPANY | VEHICLE USE |
|---|---|---|---|---|---|---|
| 1 | 224.0.0.0 | 1K | 1 | YES/NO | OEM | 1. GENERAL<br>2. COMPANY<br>3. LOADED VEHICLE<br>4. PUBLIC |

# V2V COMMUNICATION METHOD AND APPARATUS USING THE SAME

The present application claims priority to Korean Patent Application No. 10-2018-0107712, filed on Sep. 10, 2018, the entire contents of which is incorporated herein for all purposes by this reference.

BACKGROUND OF THE INVENTION

Field of the Invention

The present invention relates to a vehicle to vehicle (V2V) communication method and an apparatus using the same, and more particularly, a V2V communication method and an apparatus using the same, for changing a communication method with a surrounding vehicle in consideration of an event type.

Description of Related Art

The automotive industry has been rapidly developed day by day. Recently, vehicle to everything (V2X) communication has been introduced. Here, X of V2X refers to everything, i.e., Infra/Vehicle/Nomadic/ . . . , refers to any type communication method applicable to a vehicle, and refers to detailed communication technology for embodying the general term 'connected vehicle' or 'networked vehicle'. In the instant case, V2X communication is broadly classified into communication of vehicle to infrastructure, vehicle to vehicle communication, and vehicle to nomadic device communication and, recently, other communication types are expected to be added.

Thereamong, vehicle to vehicle (V2V) communication refers to communication between a host vehicle (HV) and a surrounding vehicle. However, a general HV communicates with a surrounding vehicle using a broadcasting method to cause inconvenience, which is described below with reference to FIG. 1.

FIG. 1 is a diagram showing a general V2V communication method.

Referring to FIG. 1, an HV 11 may V2V-communicate with surrounding vehicles 12 to 15 using a broadcasting method. On the other hand, the surrounding vehicles 12 to 15 may also use a broadcasting method during communication with another vehicle except for the corresponding surrounding vehicle. Accordingly, each vehicle needs to receive and analyze communication frames (e.g., an Ethernet frame) transmitted by all surrounding vehicles and, thus, overload due to accumulation of frame processing as well as excessive radio traffic may be generated. As a result, there is a problem in that it is not possible to process data of an important event such as accident occurrence on a road in real time.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle to vehicle (V2V) communication method and an apparatus using the same, for changing a communication method based on an event type.

Various aspects of the present invention are directed to providing a V2V communication method and an apparatus using the same, for multicasting all data to a multicasting group corresponding to an event depending on a type of the event instead of broadcasting the data.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In various aspects of the present invention, as embodied and broadly described herein, a method of controlling vehicle to vehicle (V2V) communication may include, when an event occurs, determining whether the event is an important event, when the event is the important event, broadcasting data of the event, when the event is not the important event, determining a transmission method depending a communication situation with a surrounding vehicle, and multicasting or broadcasting the data of the event depending on the determined transmission method.

In another aspect of the present invention, a vehicular communication switch apparatus may include an external vehicle information management module configured to determine whether an event is an important event when the event occurs and to determine a transmission method depending a communication situation with a surrounding vehicle when the event is not the important event, and a transmission management module configured to multicast or broadcast data of the event depending on the determined transmission method, herein, when the event is the important event, the external vehicle information management module controls the transmission management module to broadcast the data of the event.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a diagram showing an example of a configuration of information for each external vehicle, stored in the storage of FIG. 4.

Figure 1:
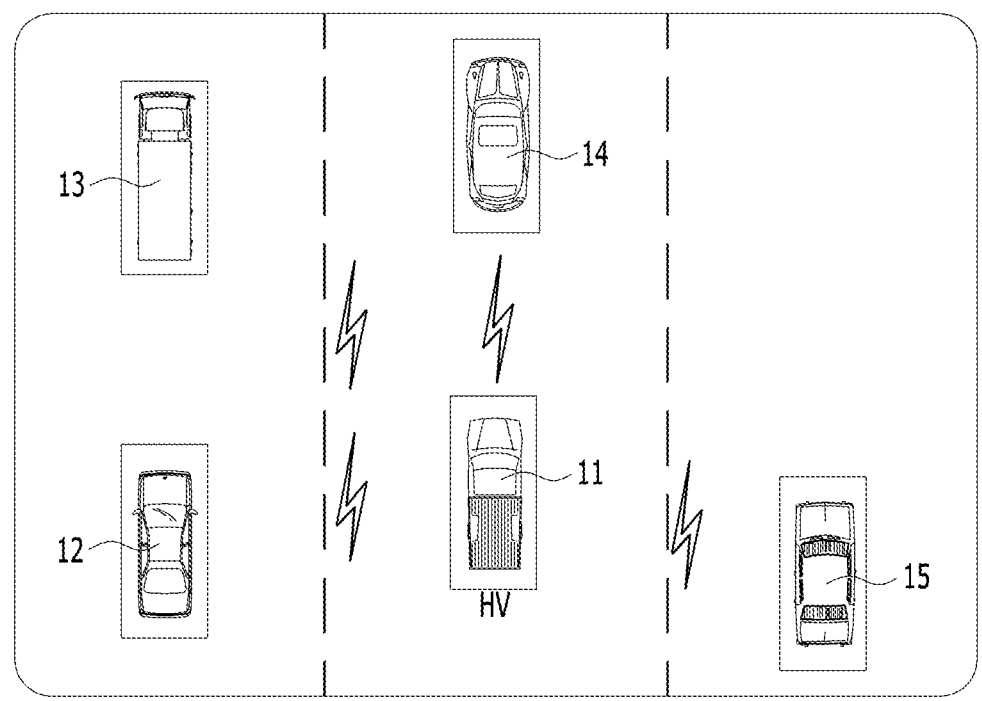
FIG. 1 is a diagram showing a general vehicle to vehicle (V2V) communication method.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. The suffixes "module" and "unit" of elements herein are used for convenience of description and thus may be used interchangeably and do not have any distinguishable meanings or functions. In the following description of the at least an exemplary embodiment of the present invention, a detailed description of known functions and configurations incorporated herein will be omitted for clarity and for brevity. The features of the present invention will be more clearly understood from the accompanying drawings and may not be limited by the accompanying drawings, and it is to be appreciated that all changes, equivalents, and substitutes that do not depart from the spirit and technical scope of the present invention are encompassed in an exemplary embodiment of the present invention.

The terms such as "first" and "second" are used herein merely to describe a variety of constituent elements, but the constituent elements are not limited by the terms. The terms are used only for distinguishing one constituent element from another constituent element.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The singular expressions in the exemplary embodiment include the plural expressions unless clearly specified otherwise in context.

Throughout the present specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

First, a concept of broadcasting and multicasting applied to embodiments of the present invention is described with reference to FIG. 2.

Figure 2:
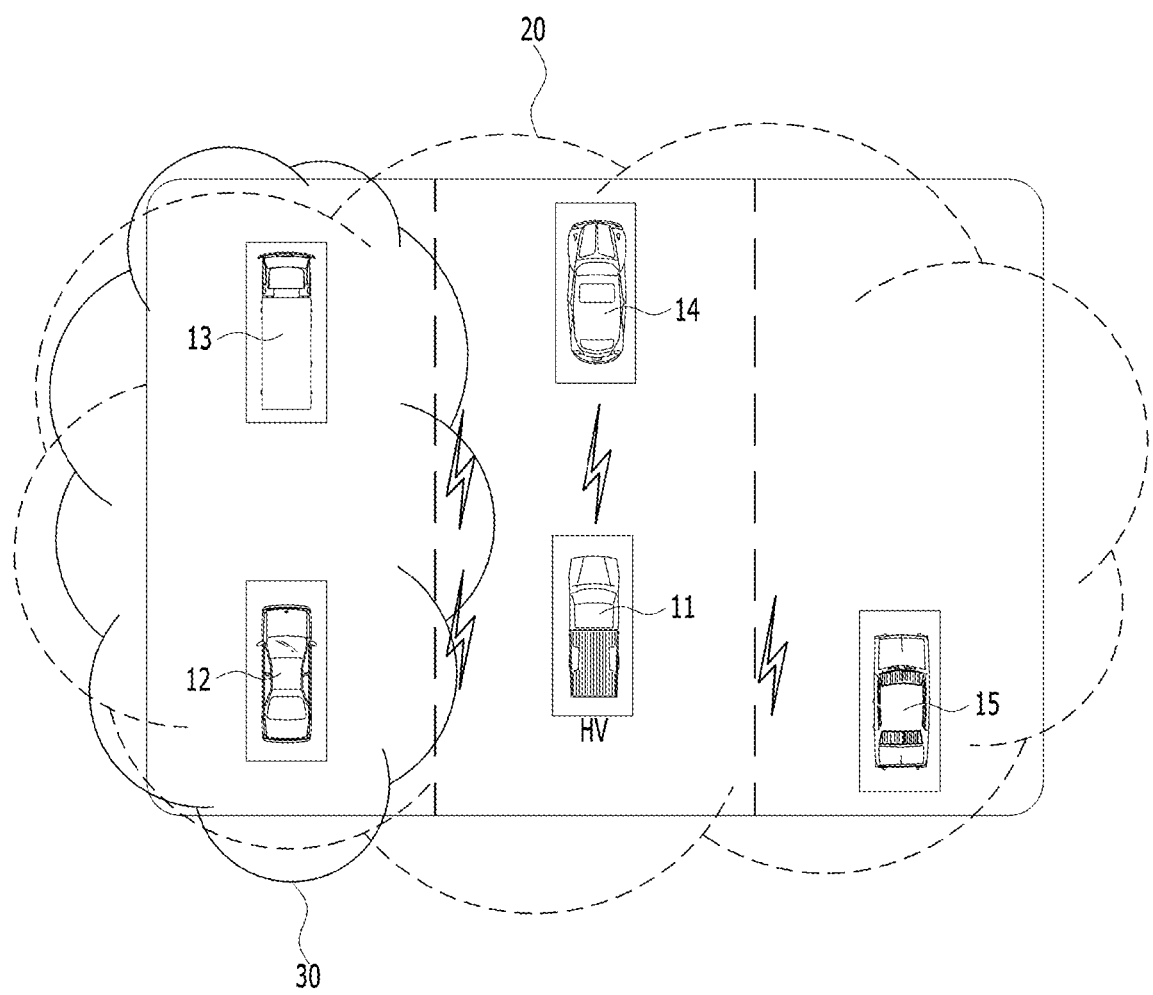
FIG. 2 is a diagram for explanation of a concept of broadcasting and multicasting applied to embodiments of the present invention.

FIG. 2 is a diagram for explanation of a concept of broadcasting and multicasting applied to embodiments of the present invention.

Referring to FIG. 2, a method of transmitting data to all vehicles (e.g., vehicles 12 to 15) positioned within transmission coverage 20 from a host vehicle (HV) 11 may be referred to as a broadcast method. On the other hand, a method of transmitting data to vehicles 12 and 13 belonging to a preset group (i.e., a multicasting group) according to a specific reference (e.g., which is positioned on the left of the HV 11) may be referred to as a multicast method. When data is transmitted to the multicasting group, the other external vehicles 14 and 15 do not necessarily receive corresponding data and, thus, the corresponding vehicles 14 and 15 may achieve an effect of reducing radio traffic and frame processing load due to data reception. Accordingly, in the case of data of an important event, which needs to be transmitted to all surrounding vehicles, it may be desirable that the data be transmitted using a broadcast method even if some traffic is generated and, in the case of data of an event, which only needs to be transmitted to a vehicle group (i.e., a multicasting group) having specific common characteristics, it may be desirable that the data be transmitted using a multicast method.

The multicast method and the broadcast method may be selected depending on a type of an event detected by a host vehicle (HV). A configuration of a vehicle therefore is described with reference to FIG. 3 and FIG. 4.

Figure 3:
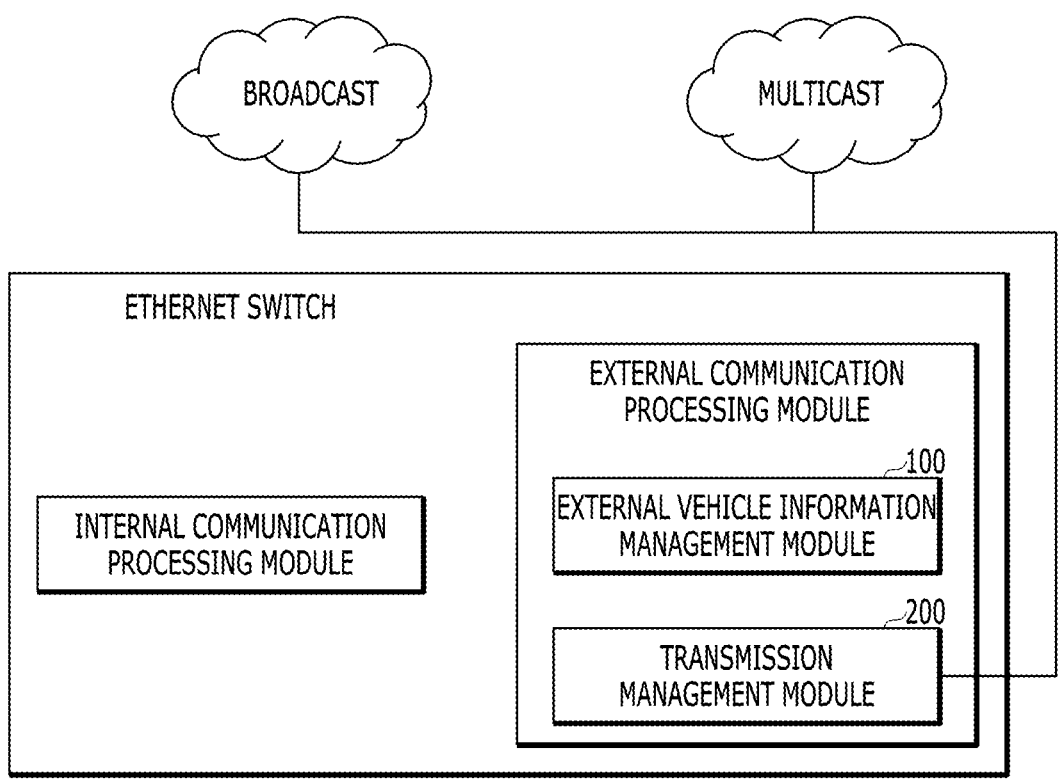
FIG. 3 is a block diagram showing an example of a configuration of a vehicle according to an exemplary embodiment of the present invention and FIG. 4 is a block diagram showing an example of a configuration of an external vehicle information management module shown in FIG. 3.
Figure 4:
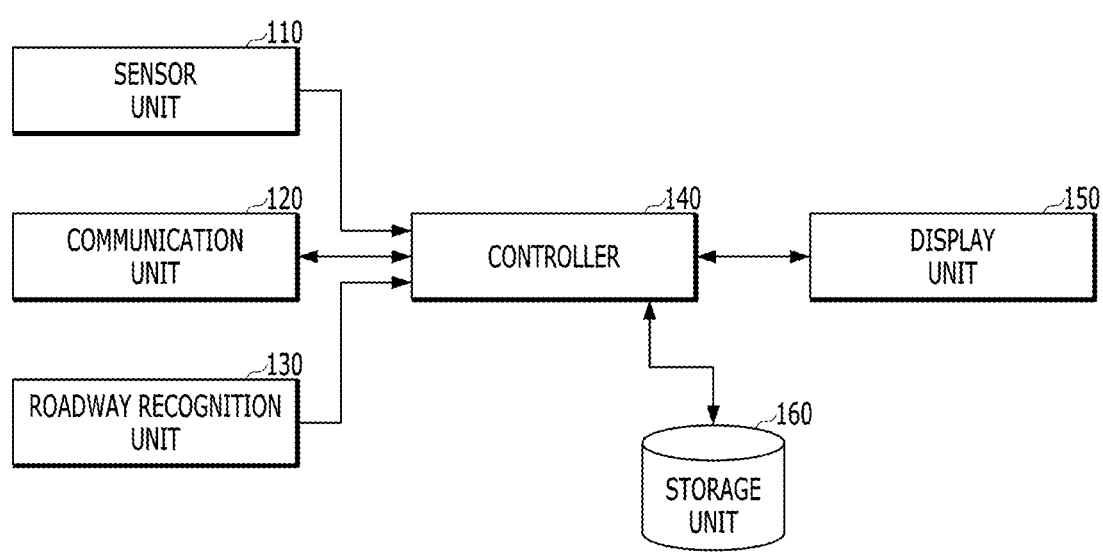

FIG. 3 is a block diagram showing an example of a configuration of a vehicle according to an exemplary embodiment of the present invention. FIG. 4 is a block diagram showing an example of a configuration of an external vehicle information management module shown in FIG. 3.

Referring to FIG. 3, a vehicle according to an exemplary embodiment of the present invention may include an Ethernet switch. Needless to say, the Ethernet switch is assumed to perform Ethernet protocol-based communication such as wireless access in vehicular environment (WAVE) in vehicle to vehicle (V2V) communication and it would be obvious to one of ordinary skill in the art that, when another protocol is used in V2V communication, the Ethernet switch is replaced with a switch of the corresponding protocol. The Ethernet switch may broadly include an internal communication processing module and an external communication processing module. The internal communication processing module may process an Ethernet frame exchanged in a vehicle and the external communication processing module may process the Ethernet frame transmitted from outside the vehicle.

The external communication processing module may include an external vehicle information management module 100 and a transmission management module 200. The external vehicle information management module 100 may acquire and manage information related to an external vehicle and the transmission management module 200 may multicast or broadcast transmission target data depending on a transmission method determined by the external vehicle information management module 100. A configuration and function of the external vehicle information management module is described in more detail with reference to FIG. 4.

Referring to FIG. 4, the external vehicle information management module 100 may include a sensor unit 110, a communication unit 120, a roadway recognition unit 130, a controller 140, a display unit 150, and a storage unit 160.

The sensor unit 110 may include one or more sensors for detecting a distance, a position, relative speed, etc., with respect to at least one surrounding vehicle.

The communication unit 120 may wirelessly communicate with a surrounding vehicle. Wireless communication technology may employ V2V communication technology including WAVE. Furthermore, wireless communication technology such as wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSDPA), long term evolution (LTE), or long term evolution-advanced (LTE-A) may also be employed in the range applicable to a vehicle. The communication unit 120 may transmit a radio signal to an external vehicle or may receive a radio signal from a surrounding vehicle.

The roadway recognition unit 130 may recognize a driving roadway of at least one of a host vehicle (HV) and a surrounding vehicle through the sensor unit 110. A vehicle recognizing method of an HV may correspond to general advanced driver assistance system (ADAS) technology and, thus, a detailed description thereof is omitted here.

For example, to recognize a roadway of each surrounding vehicle, the roadway recognition unit 130 may wirelessly communicate with a surrounding vehicle through the communication unit 120. The roadway recognition unit 130 may ask about a driving roadway of the surrounding vehicle through the communication unit 120 and may receive a response thereto to recognize the driving roadway of the surrounding vehicle.

As another method, the roadway recognition unit 130 may also recognize a direction of a surrounding vehicle using a sensor for recognizing a position of the surrounding vehicle. For example, when the HV 11 measures a distance from the surrounding vehicle through the sensor unit 110 for detecting a distance and recognizes a direction of the surrounding vehicle using a sensor or for recognizing a direction thereof, the roadway recognition unit 130 may also recognize a driving roadway of the corresponding surrounding vehicle based on the measured distance and the recognized direction thereof.

The controller 140 may control an overall operation of the external vehicle information management module 100.

For example, the controller 140 may acquire a position, a lane, vehicle information, etc. of a surrounding vehicle through the sensor unit 110, the communication unit 120, and the roadway recognition unit 130. Here, the vehicle information may include a manufacturing company, a vehicle use, whether communication is possible, and the like. To acquire the vehicle information through the communication unit 120, the controller 140 may control transmission power to correspond to required communication coverage.

The controller may be configured to determine whether an event occurs and an event type according to information acquired through at least one of the sensor unit 110, the communication unit 120, and the roadway recognition unit 130, may determine a communication method depending on the determined event type, and may notify the transmission management module 200 of the determined communication method.

The display unit 150 may display (output) information processed by the controller 140. For example, the display unit 150 may be disposed on a display, a head-up display (HUD), a cluster, or the like of an AVN system and may display execution image information related to an application program driven by each component or information on a user interface (UI) or a graphical user interface (GUI) according to the execution image information. For example, the controller 140 may control the display unit 150 to display relative position or information related to each surrounding vehicle based on distance and roadway information related to each surrounding vehicle.

The display unit 150 may include at least one of a liquid crystal display (LCD), a thin film transistor-liquid crystal display (TFT LCD), an organic light-emitting diode (OLED) display, a flexible display, a 3D display, and an e-ink display.

The storage unit 160 may store a program for an operation of the controller 140 and may temporally store input/output data (e.g., information for each external vehicle).

The storage unit 160 may include at least one type of storage medium of a flash memory type, a hard disk type, a solid state drive (SSD) type, a silicon disk drive (SDD) type, a multimedia card micro type, a card type memory (e.g., an SD or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The storage unit 160 may be operatively associated with a web storage on the Internet.

The form of information for each external vehicle, stored in a storage, is described with reference to FIG. 5.

FIG. 5 is a diagram showing an example of a configuration of information for each external vehicle, stored in the storage of FIG. 4.

Referring to FIG. 5, the information for each external vehicle may be configured in a form of a table and may include a field of an identifier (ID), a group, a distance, a lane, whether communication is possible, a manufacturing company, or a vehicle use. Such a field configuration is exemplary and, thus, the present invention is not limited thereto and, as necessary, the information may include greater or fewer fields than in the current case.

The ID field may be allocated in connection with identification information (e.g., a hardware address of a wireless communication module or information for identification with respect to other vehicles, such as a vehicle number) of an external vehicle without being limited thereto and may be dynamically generated to avoid repetition.

The distance field refers to a distance between a corresponding external vehicle and a host vehicle (HV) and the lane field refers to a current lane of the corresponding external vehicle.

The manufacturing company field and the vehicle use field may indicate information which is used as the base for generation of a multicasting group for each event type.

The field indicating whether communication is possible may include information indicating whether a corresponding external vehicle supports communication, a type of a supported protocol, intensity of a connected signal, and the like.

Furthermore, the group field may include transmission IP information allocated to a multicasting group including a corresponding external vehicle.

To acquire information shown in FIG. 5, the controller 140 may first determine whether a vehicle is configured for wirelessly transmitting/receiving data through the communication unit 120 and may acquire vehicle information related to a manufacturing company of the vehicle and the vehicle use. As such, when multicast type communication needs to be performed, the controller 140 may generate a group based on data of the storage unit 160. To maintain validity of frequently changed information items, the controller 140 may determine intensity of the connected signal and whether communication-connection is achieved and may continuously update the date of the storage unit 160.

Through the aforementioned vehicle configuration, both multicast communication and broadcast communication depending on a situation may be supported. Hereinafter, a procedure of transmitting data depending on whether an event occurs in a vehicle according to an exemplary embodiment of the present invention is described with reference to FIG. 6.

Figure 6:
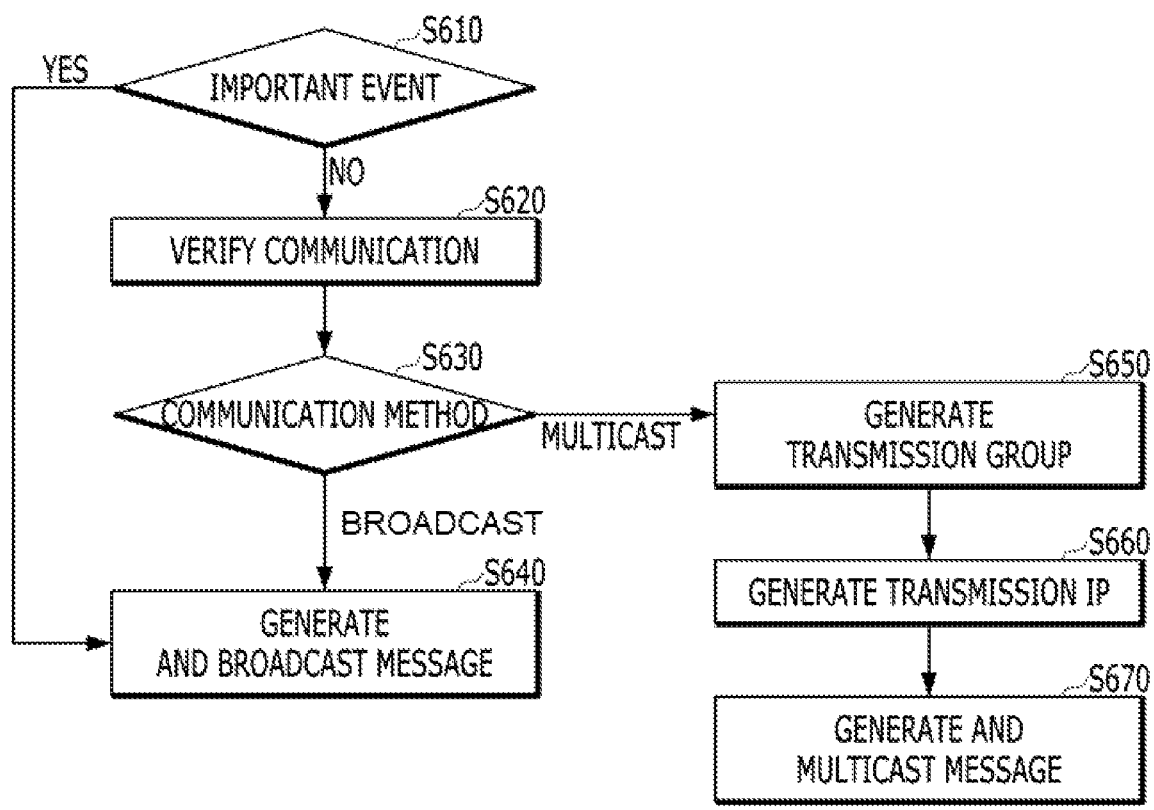
FIG. 6 is a flowchart showing an example of a data transmission method according to an exemplary embodiment of the present invention.

FIG. 6 is a flowchart showing an example of a data transmission method according to an exemplary embodiment of the present invention.

Referring to FIG. 6, first, the controller 140 may determine whether an important event occurs (S610). Here, the important event may refer to a situation in which all surrounding vehicles need to be warned, for example, the case in which an accident is determined to be likely to occur based on in-vehicle data (e.g., central data such as velocity, Global Positioning System (GPS) coordinates, a lane position, a driving state, and failure of a host vehicle (HV)) or the case in which information indicating that a disaster occurs in a vehicle is received through the communication unit 120. When the important event occurs (Yes of S610), the controller 140 may generate a message and may broadcast the message to rapidly provide information for allowing surrounding vehicles to recognize an urgent situation and to smoothly drive (S640). For example, the controller 140 may forward the generated message and information on the transmission method to the transmission management module 200.

When the important event does not occur (No of S610), a current situation may be a general communication situation and, thus, whether the vehicle is configured for communicating with a surrounding vehicle may be verified (S620) to determine a communication method (S630). Here, the communication verification (S620) refers to a procedure of verifying whether the vehicle is configured for communicating with the surrounding vehicle such that information on the surrounding vehicle is used to generate one or more multicasting groups. For example, when a time required to acquire information on a surrounding vehicle is insufficient, like at the beginning of driving, or a surrounding driven vehicle is largely changed due to a change in a path or the like, information may be insufficient to generate the multicasting group.

Accordingly, when the communication method is determined (S630), if it is possible to generate a multicasting group appropriate to transmit information on the generated event, the communication method may be determined as a multicast method (multicast of S630) and, otherwise, the communication method may be determined as a broadcast method (broadcast of S630). Needless to say, the broadcast method may be selected event when vehicle data is externally requested as well as when a vehicle is not included in a specific multicasting group. In the instant case, a host vehicle (HV) transmits data thereof to a surrounding vehicle at the beginning of communication to help the surrounding vehicle to recognize the host vehicle (HV).

When the communication method is determined as a broadcast method, message transmission is the same as in the case in which the important event occurs and, thus, a repeated description thereof is omitted here.

When the communication method is determined as a multicast method, a transmission group (i.e., a multicasting group) including vehicles appropriate to receive the corresponding event may be generated and a transmission IP may be allocated to the corresponding multicasting group (S660). For example, the multicasting group may be selected as a vehicle in a first lane, a vehicle at about 100 m, a specific manufacturing company, a loaded vehicle, and the like.

The controller 140 may generate a message and may broadcast the message (S670). To the present end, the controller 140 may forward the generated message and information on a transmission method to the transmission management module 200.

Here, the broadcast message and the multicast message may have the same configuration but may be different in that a transmission IP allocated to a corresponding multicasting group is used during multicasting.

According to the aforementioned embodiments of the present invention, overload generated when Ethernet is used as the backbone in a vehicle may be minimized and a message depending on a predetermined method may be automatically transmitted to the outside when the vehicle needs to dynamically communicate with an external switch for vehicle to vehicle (V2V) communication, guiding smooth communication. Furthermore, next-generation communication may be supported via logic change of an existing switch without additional installation of a separate module. Accordingly, an unnecessary message may be prevented from being broadcast to maximize traffic performance of an in-vehicle switch and to also enable rapid response in a case of emergency.

According to the aforementioned various embodiments of the present invention, whether broadcasting is used may be determined in consideration of an event type, facilitating effective communication.

When all surrounding vehicles do not necessarily receive corresponding data depending on an event, the corresponding data may be multicast to a multicasting group that requires the data, reducing load for processing radio traffic and a frame.

It will be appreciated by persons skilled in the art that the effects which may be achieved with the present invention are not limited to what has been particularly described hereinabove and other advantages of the present invention will be more clearly understood from the above detailed description taken The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, etc.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling vehicle to vehicle (V2V) communication, the method comprising:
   determining, by a vehicular communication switch apparatus mounted in a vehicle, when an event corresponds to a predetermined event;
   when the event corresponds to the predetermined event, broadcasting, by the vehicular communication switch apparatus, data of the event to at least a surrounding vehicle;
   when the event does not correspond to the predetermined event, determining, by the vehicular communication switch apparatus, a transmission method depending a communication situation with the at least a surrounding vehicle; and
   multicasting or broadcasting, by the vehicular communication switch apparatus, the data of the event depending on the determined transmission method.

2. The method of claim 1, further including:
   when the determined transmission method is a multicast method, generating a transmission group corresponding to the data of the event; and
   allocating a transmission address (IP) to the generated transmission group.

3. The method of claim 2, wherein, when the determined transmission method is the multicast method, the multicasting or broadcasting of the data includes:
   generating a message including the data of the event; and
   multicasting the message to the transmission group using the allocated transmission address.

4. The method of claim 2, further including:
   collecting information for each external vehicle with respect to each of the at least a surrounding vehicle.

5. The method of claim 4,
   wherein the information for each external vehicle includes at least one of an identifier (ID), a distance, a lane, when communication therebetween is possible, a manufacturing company, and a vehicle use.

6. The method of claim 4,
   wherein the generating of the transmission group is performed in consideration of the information for each external vehicle.

7. The method of claim 4,
   wherein the determining of the transmission method includes determining the transmission method as a broadcast method when the information for each external vehicle is insufficient to generate the transmission group or when data of a host device is requested by an external vehicle among the at least a surrounding vehicle.

8. The method of claim 1,
   wherein the predetermined event includes at least one of an accident occurrence situation detected by a host vehicle, a failure situation, and a reception of disaster notification.

9. The method of claim 1,
   wherein the multicasting or broadcasting of the data includes transmitting an Ethernet frame.

10. A non-transitory computer readable recording medium having recorded thereon a program for executing the method of controlling the V2V communication of claim 1.

11. A vehicular communication switch apparatus mounted in a vehicle, the apparatus comprising:
    an external vehicle information management module configured to determine when an event corresponds to a predetermined event and to determine a transmission method depending a communication situation with at least a surrounding vehicle when the event does not correspond to the predetermined event; and
    a transmission management module configured to multicast or broadcast data of the event depending on the determined transmission method,
    wherein, when the event corresponds to the predetermined event, the external vehicle information management module is configured to control the transmission management module to broadcast the data of the event.

12. The vehicular communication switch apparatus of claim 11,
    wherein, when the determined transmission method is a multicast method, the external vehicle information management module generates a transmission group corresponding to the data of the event and allocates a transmission address (IP) to the generated transmission group.

13. The vehicular communication switch apparatus of claim 12,
    wherein, when the determined transmission method is the multicast method, the external vehicle information management module generates a message including the data of the event and multicasts the message to the transmission group using the allocated transmission address.

14. The vehicular communication switch apparatus of claim 12,
    wherein the external vehicle information management module includes a communication unit configured to collect information for each external vehicle with respect to each of the at least a surrounding vehicle.

15. The vehicular communication switch apparatus of claim 14,
    wherein the information for each external vehicle includes at least one of an identifier (ID), a distance, a lane, when communication therebetween is possible, a manufacturing company, and a vehicle use.

16. The vehicular communication switch apparatus of claim 14,
    wherein the external vehicle information management module generates the transmission group in consideration of the information for each external vehicle.

17. The vehicular communication switch apparatus of claim 14,
    wherein the external vehicle information management module determines the transmission method as a broadcast method when the information for each external vehicle is insufficient to generate the transmission group or when data of a host device is requested by an external vehicle.

18. The vehicular communication switch apparatus of claim 11,
    wherein the predetermined event includes at least one of an accident occurrence situation detected by a host vehicle, a failure situation, and a reception of disaster notification.

19. The vehicular communication switch apparatus of claim 11, further including an Ethernet switch.

\* \* \* \* \*